United States Patent Office 3,030,371
Patented Apr. 17, 1962

3,030,371
PROCESS FOR THE PREPARATION OF D- AND
L-ARYL-(2-PYRIDYL)-AMINO ALKANES
Lewis A. Walter, Madison, N.J.
No Drawing. Filed Mar. 4, 1958, Ser. No. 718,991
4 Claims. (Cl. 260—296)

This invention relates to certain novel optically active forms of aryl-(2-pyridyl)-alkyl substituted tertiary amines and to processes for preparing the same. More particularly, the invention relates to therapeutic optically active forms of aryl-(2-pyridyl)-alkyl substituted tertiary amines and certain halogen substituted derivatives thereof as well as to the method of producing these compounds.

Heretofore, racemates of certain members of this class of amines [e.g. dl-3-(2-pyridyl)-3-p-chlorophenyl-N,N-dimethylpropylamine] have been known to be highly effective against histamine-induced allergic reactions, which are brought about by a large and varied number of causative agents. The antihistaminic activity uniquely manifested by these substances coupled as it has been with a significant reduction in undesirable toxic reactions over those materials previously known, has represented a prominent but apparently conclusive achievement which wide and intensive study has hitherto failed to eclipse.

However, I have now succeeded in resolving these dl-aryl-(2-pyridyl)-alkyl substituted tertiary amines as described hereinafter into their optically active d-(+) and l-(−) forms by reaction of the racemates with certain optically active acids, thus for the first time making these isomers available for therapeutic use; and for the first time substantially isolating and significantly increasing the antihistaminic activity in certain of these isomers while simultaneously producing the optical antipodes thereof, which are useful, as valuable psychotherapeutic agents substantially free of antihistaminic activity. Thus the d-forms normally and particularly provide markedly enhanced antihistaminic components substantially free of untoward side effects, and the l-forms thereof yield normally substances having local anesthetic properties, valuable psychotherapeutic application, e.g. as non-addictive sedatives, hypnotics and ataraxic agents, and which are also useful as antiemetics in the alleviation of the symptoms of motion sickness. These isomers can be employed pharmaceutically either in the form of a free base or in the form of their non-toxic acid addition salts as described hereinafter.

The pharmacologically active optical antipodes of my invention are resolved from racemates of amine compounds of the following general formula:

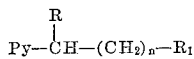

wherein Py is a pyridine radical; R is a phenyl nucleus; R₁ is a dialkylamino (preferably a lower dialkylamino), morpholino, piperidino, or pyrrolidino radical; and n is an integer preferably of from two to three, inclusive, and not in excess of four. It should be understood that the phenyl nucleus referred to as R can contain one or more substituents such as lower alkyl, lower alkoxy, hydroxy, halogen (e.g. bromine, chlorine), amino, lower alkyl substituted amino, acylamino, nitro, carboxy and carbalkoxy radicals. Thus the term "phenyl nucleus" as employed throughout this specification is intended to embrace, unless otherwise explicitly indicated, these substituted derivatives as well.

The process of my invention comprises treating a dl-amine as described hereinabove with an optically active d- or l-isomer of a substituted succinic acid and most desirably a mono-substituted succinic acid wherein the substituent can, for example, be an aryl, lower alkoxy or halogen substituted aryl, thienyl, cycloalkyl, or alkyl radical, in the presence of an organic solvent i.e. a non-reactive compatible solvent such as an aliphatic alcohol to cause the formation of the corresponding diastereoisomeric salts thereof, separating the salts so obtained by fractional crystallization, and releasing each of the desired d- and l-isomers from the separated amine salts. In carrying out this process, it is normally preferable to use equivalent amounts of racemate and optically active acid. However, these proportions are in no way critical and mole ratios of amine racemate to optically active acid of 2:1 are wholly operative and indeed under certain circumstances preferred. It should be noted that it is significantly advantageous to employ either of the d- and l-isomers of phenylsuccinic acid as the resolving agent, particularly where it is sought to separate out the optical antipodes of halogenated racemates, such as for example, dl - 3 - (2 - pyridyl) - 3 - p-chlorophenyl - N,N - dimethylpropylamine or dl-3-(2-pyridyl)-3-p-bromophenyl-N,N-dimethylpropylamine. The liberation of the isomeric free amine can be accomplished by the introduction of the isolated isomeric salt into aqueous alkali (e.g. sodium carbonate, potassium hydroxide, sodium hydroxide and the like) and a suitable selective organic solvent, that is a substantially water-immiscible solvent such as for example, diethyl ether, benzene, methyl isobutyl ketone, isopropyl acetate, isobutyl alcohol, sec. butyl alcohol and the like, in which the free amine base is soluble.

The d- and l-optical isomers obtained in accordance with the practice of my invention are obtained in pure form and substantially free of their optical antipodes and can be reacted directly with suitable mineral and organic acids, such as, for example, hydrochloric acid, hydrobromic acid, sulfuric acid, phosphoric acid, tartaric acid, citric acid, succinic acid and most desirably maleic acid and gluconic acid preferably in equimolar amounts and in a suitable solvent to form the corresponding non-toxic, therapeutically useful acid addition salts thereof.

In addition, the therapeutic applications of the antihistaminic isomers of my invention, e.g. d-3-(2-pyridyl)-3-p-chlorophenyl-N,N-dimethylpropylamine and d-3-(2-pyridyl)-3-p-bromophenyl-N,N-dimethylpropylamine and d-3-(2-pyridyl)-3-phenyl-N,N-dimethylpropylamine, can be extended by reaction thereof with acidic xanthines and particularly haloxanthines to form the salts thereof. It should be noted that hitherto it has been suggested to employ various antihistamines in the form of their substituted xanthine salts to neutralize the untoward side effects of these former compounds. These undesirable reactions have been so substantially eliminated by the process of my invention and particularly in those antihistaminic d-isomers described immediately above as to render this conversion where performed for this reason alone essentially valueless. However, salts of these isomers, as well as others within the scope of this invention are so devoid of undesirable side effects that they are of particular and enhanced utility over compounds heretofore known in the alleviation and prevention of symptoms of nausea due to pregnancy, Ménièrl's syndrome, nausea following general anesthesia and the like.

Among these acidic xanthines which can be so employed are the chloro, bromo, and iodo derivatives of theophylline and related xanthines which have a hydrogen atom in the seven position. Illustrative of these xanthines are the following: 3-methyl-8-chloroxanthine, 8-chlorotheophylline, 8-bromotheophylline, 8-chloroxanthine, 8-iodo-1,3-diethylxanthine, 8-iodotheophylline, 1,3-diethyl-8-chloroxanthine, 1-3-diethyl-8-bromoxanthine and 8-bromoxanthine. Salts of the antihistaminic isomers of my invention and acidic xanthines can be prepared by forming a mixture of the isomer of the free amine and a haloxanthine, preferably, although not necessarily, in approximately equivalent amounts, in a suitable polar solvent, such as for example, the lower alcohols, e.g. methanol, ethanol, and ketones, e.g. acetone, methylethyl ketone, and mixtures thereof with water; ethers, hydrocarbons and the like. The desired salt crystallizes out normally when the solution is chilled or upon standing at room temperature for more extended periods of time. This precipitation can be aided by the introduction of ether, benzene or like suitable organic solvent into the solution. By way of further illustration, approximately equivalent amounts of amine base and haloxanthine can be mixed with small amounts of water at temperatures in the range of 45° C. to 100° C. to cause the formation of a thick paste or granular material, which upon chilling becomes solid, and can be broken up, and ground to a powder which is then dried.

The preferred optically active isomers obtained in accordance with the practice of my invention are d-3-(2-pyridyl)-3-p-chlorophenyl-N,N-dimethylpropylamine, d-3-(2 - pyridyl) - 3 - p - bromophenyl - N,N - dimethylpropylamine, d - 3 - (2 - pyridyl) - 3 - phenyl - N,N-dimethylpropylamine, and l-3-(2-pyridyl)-3-phenyl-N,N-dimethylpropylamine.

The d- and l-isomers of my invention either as the free base or in the form of a non-toxic salt thereof e.g. maleate, gluconate, theophyllinate etc. can be administered orally in the form of tablets, elixirs, capsules and the like. In tablet form, they are compounded with an inert carrier which may contain a suitable binder, such as, for example, gums, starches and sugars. It may also be incorporated into a gelatin capsule, and it can also be formulated into elixirs which have the advantage of being susceptible to manipulations in flavor by the addition of standard natural or synthetic flavoring materials. Where desired, the isomers of my invention and their corresponding salts can be administered parenterally by incorporation thereof into suitable injectable solutions employing such non-toxic carriers, as for example, water, propylene glycol, polyethylene glycol and the like. They can also be formulated into topical ointments, creams and the like when topical application to the skin or mucosa is the preferred mode of administration. Similarly they may be employed in standard formulations for ear and ophthalmic suspensions. Where oral or parenteral administration of the halogenated antihistamines, e.g. d-3-(2-pyridyl)-3-p-chlorophenyl-N,N-dimethylpropylamine and d-3-(2-pyridyl)-3-p-bromophenyl-N,N-dimethylpropylamine, and their non-toxic salts is undertaken, total daily dosages of from about 5 mg. to 50 mg. are desirable; with the non-halogenated antihistaminic derivative, d - 3 - (2 - pyridyl) - 3 - phenyl - N,N - dimethylpropylamine, a daily oral or parenteral dosage in the range of 25 mg. to 200 mg. is preferred. For topical application or use in nasal sprays or ear and ophthalmic suspensions daily applications of the halogenated antihistaminic compounds in a dosage range of 0.25 percent (2.5 mg./ml.) to 2.0 percent (20.0 mg./ml.) and more are acceptable, and in the case of the non-halogenated form, up to 5 percent (50 mg./ml.) is often preferred. Psychotherapeutically active isomers and their non-toxic salts, such as, for example, l-3-(2-pyridyl)-3-phenyl-N,N-dimethylpropylamine or the corresponding maleate thereof can be administered orally or parenterally in a dosage range of from 25 mg. to 100 mg. daily.

The optical antipodes of the non-halogenated compounds of my invention, such as, for example, d- and l-3-(2-pyridyl)-3-phenyl-N,N-dimethylpropylamine can, in addition to being prepared from the corresponding racemic mixture as described herein, be produced by dehalogenation of the corresponding halogen (e.g. bromine, chlorine) substituted phenyl optical isomers. This dehalogenation step is desirably accomplished by standard catalytic dehalogenation procedures. An illustrative method comprises forming a mixture of the halogenated amine dissolved in a suitable solvent (i.e. an aliphatic alcohol) and preferably in the presence of at least an equivalent amount of mineral acid (e.g. hydrochloric acid, hydrobromic acid, phosphoric acid) or organic acid (e.g. acetic acid, propionic acid and the like) with palladium on charcoal in the presence of hydrogen and preferably in a closed vessel.

Further illustrative of the optically active isomers prepared according to the practise of my invention are: l-3-(2 - pyridyl)3 - p - chlorophenyl - N,N - dimethylpropylamine, l - 3 - (2 - pyridyl) - 3 - p - bromophenyl - N,N-dimethylpropylamine, d-3-(2-pyridyl)-3-p-bromophenyl-1-pyrrolidinopropane, l-3-(2-pyridyl)-3-p-bromophenyl-1-pyrrolidinopropane, d-3-(2-pyridyl)-3-p-bromophenyl-1-morpholinopropane, l-3-(2-pyridyl)-3-p-bromophenyl-1-morpholinopropane, d-3-(2-pyridyl)-3-p-chlorophenyl-1-pyrrolidinopropane, l-3-(2-pyridyl)-3-p-chlorophenyl-1-pyrrolidinopropane, d-3-(2-pyridyl)-3-p-chlorophenyl-1-piperidinopropane, l-3-(2-pyridyl)-3-p-chlorophenyl-1-piperidinopropane, d-3-(2-pyridyl)-3-p-chlorophenyl-1-morpholinopropane and l-3-(2-pyridyl)-3-p-chlorophenyl-1-morpholinopropane.

Examples of the optically active substituted succinic acids which can be employed in the practise of my invention are the d- and l-isomers of each of the following: o-chlorophenyl-succinic acid, p-nitrophenyl succinic acid, p-methoxyphenylsuccinic acid, α-2-thienylsuccinic acid, monobenzylsuccinic acid, methylsuccinic acid, butylsuccinic acid, ethylsuccinic acid, propylsuccinic acid, cyclopentylsuccinic acid, and preferably as noted above, phenylsuccinic acid.

The non-reactive organic solvent employed herein to effect the desired resolution of optical isomers is not narrowly critical and while aliphatic alcohols such as isopropyl alcohol, isobutyl alcohol, n-butyl alcohol, secondary butyl alcohol, and particualrly ethanol (i.e. absolute and aqueous solutions thereof wherein water can be present in concentration of up to 20 percent and more) are preferred, other solvents and combinations thereof are wholly operative. (Percentages referred to herein unless otherwise explicitly indicated refer to percentages by weight.) Thus, for example, ketones (e.g. acetone, methylethyl ketone), esters (e.g. isopropyl acetate, ethyl acetate, butyl acetate), nitriles (e.g. acetonitrile, propionitrile) and the like can also be employed.

It should be noted that while the process of my invention is normally carried out between about 20° C. and 100° C., higher and lower temperatures can also be used. Generally, temperatures in excess of about 100° C. should not be used since they tend to have a deteriorative effect on the resolved isomers thereof.

The following examples are further illustrative of the invention:

*Example 1*

Twenty grams of d-phenylsuccinic acid and 28 g. of 3-(2-pyridyl)-3-p-chlorophenyl-N,N-dimethylpropylamine are dissolved in 400 ml. of absolute ethyl alcohol and allowed to stand at room temperature until crystallization is effected. The crystals are filtered, washed with absolute ethyl alcohol and recrystallized from 300 ml. of this solvent in the same manner. The crystals so obtained are recrystallized twice from 80% ethyl alcohol using 3.5 ml. per gram of compound in the same manner as described above and pure d-3-(2-pyridyl)-3-p-chlorophenyl-N,N-dimethylpropylamine-d-phenylsuccinate is obtained, melting point (M.P.) 145–147° (specific optical rotation at 25° C.); $[\alpha]_D^{25}$ +(+)98.7 (conc., 1% in dimethylformamide.)

This salt is shaken with 100 ml. of diethyl ether and 50 ml. of 20% aqueous potassium carbonate; the ether layer is separated, dried over anhydrous potassium carbonate, filtered and the ether is removed in vacuo. The d - 3 - (2 - pyridyl) - 3 - p - chlorophenyl - N,N - dimethylpropylamine so obtained is a mobile oil; $[\alpha]_D^{25}$ (+)49.8 (conc., 1% in dimethylformamide.)

4.3 g. of the above base and 1.8 g. of maleic acid are dissolved in 20 ml. isopropyl acetate and kept at room temperature until crystallization is complete. The crystals are filtered, washed with ethyl acetate and recrystallized from 15 ml. of this solvent in the same manner. The crystalline $d$-3-(2-pyridyl)-3-p-chlorophenyl-N,N-dimethylpropylamine maleate so formed is then filtered off and dried. M.P. 113–115° C., $[\alpha]_D^{25}$ (+)44.3 (conc. 1% in dimethylformamide).

*Example 2*

The original mother liquor from the preparation of $d$ - 3 - (2 - pyridyl) - 3 - p - chlorophenyl - N,N - dimethylpropylamine-$d$-phenyl-succinate of Example 1 above, is evaporated to dryness in vacuo and the residue is shaken with ether and excess 20% aqueous potassium carbonate. The ether layer is separated, dried over anhydrous potassium carbonate, filtered and distilled in vacuo to leave an oil, $[\alpha]_D^{25}$ (−)39.2° (conc., 1% in dimethylformamide) consisting of about 75% $l$-3-(2-pyridyl)-3-p-chlorophenyl-N,N-dimethylpropylamine and 25% of the racemate. Nine grams of this mixture and 6.5 g. of $l$-phenylsuccinic acid are dissolved in 125 ml. of absolute ethyl alcohol and kept at room temperature until crystallization is complete. The crystals are filtered and crystallized twice from 80% alcohol using 3.5 ml. of solvent per gram of compound. The $l$-3-(2-pyridyl)-3-p-chlorophenyl-N,N-dimethylpropylamine-$l$-phenylsuccinate so obtained is characterized as follows: M.P. 144–146° C.,$[\alpha]_D^{25}$ −98.1° (conc., 1% in dimethylformamide). The free $l$-3-(2-pyridyl)-3-p-chlorophenyl-N,N-dimethylpropylamine is obtained from this salt as described for $d$-3-(2-pyridyl)-3-p-chlorophenyl-N,N-dimethylpropylamine in Example 1. It is a clear, mobile liquid, $[\alpha]_D^{25}$ (−)49.7 (conc., 1% in dimethylformamide), and is converted to the corresponding maleate salt, by the procedure described in Example 1; M.P. 113–115° C.; $[\alpha]_D^{25}$ (−)44.1° (conc., 1% in dimethylformamide).

*Example 3*

Sixteen grams of racemic 3-(2-pyridyl)-3-p-bromophenyl-N,N-dimethylpropylamine and 9.7 g. of $d$-phenylsuccinic acid are dissolved in 150 ml. of absolute ethyl alcohol and kept at room temperature until crystallization is effected. The crystals are filtered, washed with absolute ethyl alcohol, and recrystallized from the same solvent using 5 ml. thereof per gram of solid. Three subsequent crystallizations from 80% alcohol give $d$-3-(2-pyridyl) - 3 - p - bromophenyl - N,N - dimethylpropylamine-$d$-phenylsuccinate; M.P. 152–154° C.; $[\alpha]_D^{25}$ (+)91 (conc., 1% in dimethylformamide).

The free base, $d$-3-(2-pyridyl)-3-p-bromophenyl-N,N-dimethylpropylamine, is obtained from this salt with diethyl ether and aqueous potassium carbonate as described in Example 1; $[\alpha]_D^{25}$ +42.7 (conc., 1% in dimethylformamide).

*Example 4*

Ten grams of $d$-3-(2-pyridyl)-3-p-bromophenyl-N,N-dimethylpropylamine and 5.5 g. of $d$-glucono-$\alpha$-lactone are mixed in 50 ml. of 50% aqueous alcohol and kept at 50° C. for two hours. The solvent is then removed in a vacuum and the desired salt, $d$-3-(2-pyridyl)-3-p-bromophenyl-N-N-dimethylpropylamine-$d$-gluconate, remains as a colorless viscous oil.

*Example 5*

Sixteen grams of racemic 3-(2-pyridyl)-3-p-bromophenyl-N,N-dimethylpropylamine and 9.7 g. of $l$-phenylsuccinic acid are dissolved in 150 ml. absolute ethyl alcohol and retained at room temperature until crystallization is effected. The crystals are filtered, washed with absolute ethyl alcohol and recrystallized from the same solvent using 5 ml. thereof per gram of solid. Three subsequent crystallizations from 80% alcohol give $l$-3-(2 - pyridyl)-3-p-bromophenyl - N,N - dimethylpropylamine-$l$-phenylsuccinate; M.P. 153–154° C.; $[\alpha]_D^{25}$ −91° (conc., 1% in dimethylformamide). The free base is obtained from this salt with diethyl ether and aqueous potassium carbonate as described in Example 1.

*Example 6*

Twenty-four grams of racemic 3-(2-pyridyl)-3-phenyl-N,N-dimethylpropylamine and 19.4 g. of $d$-phenylsuccinic acid are dissolved in 200 ml. absolute isopropanol and kept at room temperature until crystallization is effected to yield $d$-3-(2-pyridyl) - 3 - phenyl - N,N - dimethylpropylamine-$d$-phenylsuccinate. The crystals are filtered, washed with the same solvent and recrystallized as described in Example 1 using 5 ml. of solvent per gram of crystalline solid. Recrystallization is repeated until the $[\alpha]_D^{25}$ is +105.9 (conc., 1% in dimethylformamide); M.P. 118° C.–120° C.

*Example 7*

$d$-3-(2-pyridyl) - 3 - phenyl - N,N - dimethylpropylamine is also prepared by catalytic dehalogenation of the optically active base from Example 1.

Fifteen grams of $d$-3-(2-pyridyl)-3-p-chlorophenyl-N,N-dimethylpropylamine, 150 ml. of methanol containing 10 cc. of glacial acetic acid and 3 g. of 5% palladium on charcoal catalyst are shaken under hydrogen at 50 p.s.i. until the theoretical pressure drop is obtained. The catalyst is filtered, the solvent removed in vacuo and the residue is shaken with excess 20% aqueous potassium carbonate and ether. The ether is separated, dried over anhydrous potassium carbonate, filtered and evaporated to leave $d$-3-(2-pyridyl)-3-phenyl-N,N-dimethylpropylamine, $[\alpha]_D^{25}$ +64.4 (C.=1% in dimethylformamide).

*Example 8*

Twelve grams of $d$-p-nitrophenylsuccinic acid (obtained by nitrating $d$-phenylsuccinic acid with fuming nitric acid at 0° C.) and 12 g. of racemic 3-(2-pyridyl)-3-phenyl-N,N-dimethylpropylamine are dissolved in 200 ml. of 95% alcohol and then kept at room temperature until crystallization is complete. The crystals of $d$-3-(2-pyridyl)-3-phenyl-N,N - dimethylpropylamine-$d$-p-nitrophenylsuccinate are filtered off, washed with alcohol and recrystallized from this solvent until pure.

The salt is filtered and shaken with 100 ml. of diethylether and 50 ml. of 20% aqueous potassium carbonate; the ether layer is separated, dried over anhydrous potassium carbonate, filtered and the ether removed on a steam bath. The product obtained is a mobile oil, $d$-3-(2-pyridyl)-3-phenyl-N,N-dimethylpropylamine.

*Example 9*

Twenty-three grams of $d$-o-chlorophenylsuccinic acid and 28 g. of 3-(2-pyridyl)-3-p-chlorophenyl-N,N-dimethylpropylamine are dissolved in 300 ml. of absolute alcohol and allowed to stand at room temperature overnight. The crystals are filtered off, washed with absolute alcohol and recrystallized four times from this solvent in the same manner to give $d$-3-(2-pyridyl)-3-p-chlorophenyl-N,N-dimethylpropylamine - $d$ - o - chlorophenylsuccinate.

The salt is filtered and shaken with 100 ml. of diethyl ether and 50 ml. of 20% aqueous potassium carbonate; the ether layer is separated, dried over anhydrous potassium carbonate; filtered and the ether removed on a steam bath. The product obtained is a mobile oil, $d$-3-(2-pyridyl)-3-p-chlorophenyl - N,N - dimethylpropylamine.

*Example 10*

Ten grams of $d$-3-(2-pyridyl)-3-p-chlorophenyl-N,N-dimethylpropylamine and 6.5 g. of $d$-glucono-$\alpha$-lactone are mixed in 50 ml. of 50% aqueous alcohol and kept at 50° C. for two hours. The solvent is then removed in a vacuum to leave the desired salt, $d$-3-(2-pyridyl)-

3,030,371

3-p-chlorophenyl - N,N - dimethylpropylamine - *d* - gluconate, as a viscous colorless oil.

*Example 11*

Twenty-one grams of *d*-benzylsuccinic acid and 27.6 g. of 3-(2-pyridyl) - 3 - p - chlorophenyl - N,N - dimethylpropylamine are dissolved in 175 ml. of absolute alcohol and allowed to crystallize at room temperature. After several of such crystallizations pure *d*-3-(2-pyridyl) - 3 - p - chlorophenyl - N,N - dimethylpropylamine-*d*-benzylsuccinate is obtained.

The salt is filtered and shaken with 100 ml. of diethyl ether and 50 ml. of 20% aqueous potassium carbonate, the ether layer is separated, dried over anhydrous potassium carbonate, filtered and the ether removed on a steam bath. The product obtained is a mobile oil, *d*-3-(2-pyridyl)-3-p-chlorophenyl-N,N-dimethylpropylamine.

*Example 12*

Ten grams of *l*-cyclohexylsuccinic acid and 16 g. of 3 - (2 - pyridyl) - 3 - p - bromophenyl - N,N - dimethylpropylamine are dissolved in 160 ml. of absolute alcohol and allowed to crystallize by standing at room temperature. The product is filtered off and recrystallized from this solvent until the pure isomer is obtained.

The salt is shaken with 100 ml. of diethyl ether and 50 ml. of 20% aqueous potassium carbonate; the ether layer is separated, dried over anhydrous potassium carbonate, filtered and the ether removed on a steam bath. The product obtained is a mobile oil, *l*-3-(2-pyridyl)-3-p-bromophenyl-N,N-dimethylpropylamine.

*Example 13*

A mixture of 15 grams of *d*-3-(2-pyridyl)-3-p-chlorophenyl-N,N-dimethylpropylamine, and 12 grams of 8-bromotheophylline are dissolved in 75 cc. of hot alcohol and 25 cc. of hot water. The solution thus formed is cooled and diethyl ether is added to cause the separation out of a light viscous water-soluble oil, *d*-3-(2-pyridyl) - 3 - p - chlorophenyl - N,N - dimethylpropylamine-8-bromotheophyllinate. The theophyllinate salt is separated from the solution and dried at about 65° C. for several days after which period of time the salt has partially crystallized. Crystallization is further effected by drying in a desiccator at room temperature.

*Example 14*

The 8-bromotheophylline salt of *d*-3-(2-pyridyl)-3-phenyl N,N-dimethylpropylamine is prepared according to the method described in Example 1 employing 13.5 g. of *d*-3-(2-pyridyl)-3-phenyl-N,N-dimethylpropylamine and 12 g. of 8-bromotheophylline in 100 cc. of boiling methyl ethyl ketone containing 5 cc. of water. This solution is filtered, evaporated and triturated with chilled diethyl ether to yield the desired salt.

*Example 15*

A mixture of 20 g. of Raney Nickel catalyst, 17 g. of *l* - 3 - (2 - pyridyl) - 3 - p - chlorophenyl - N,N - dimethylpropylamine, 2.5 g. of sodium hydroxide in 200 cc. of anhydrous ethanol was shaken in a Parr apparatus at room temperature and a pressure of 60 lbs. hydrogen. After the uptake of the theoretical quantity of hydrogen the catalyst was removed by filtration, washed thoroughly with anhydrous ethanol and the filtrate concentrated to a residue. The latter was made alkaline with sodium hydroxide and the oil extracted with ether. The ether was removed and the residue distilled to yield 14.5 g. of *l* - 3 - (2 - pyridyl) - 3 - phenyl - N,N - dimethyl - propylamine. B.P. 138–140° (1.5 mm.), $[\alpha]_D^{25}$ —63.5° (conc., 1% in dimethylformamide).

What is claimed is:
1. A method of preparing the *d*-isomer and the *l*-isomer of a compound of the formula:

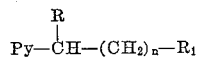

wherein Py is pyridine; R is a member of the group consisting of phenyl, lower alkylphenyl, lower alkoxyphenyl, chlorophenyl, bromophenyl, aminophenyl, lower alkylaminophenyl, nitrophenyl, carboxyphenyl, and carbalkoxyphenyl; $R_1$ is a member of the group consisting of dialkylamino, morpholino, pyrrolidino and piperidino groups; and *n* is an integer of from 2–4, which comprises reacting a racemate of said isomers with an optically active isomer of a substituted succinic acid selected from the group consisting of phenylsuccinic, chlorophenylsuccinic, nitrophenylsuccinic, methoxyphenylsuccinic, α-2-thienylsuccinic, benzylsuccinic, lower alkylsuccinic and cyclopentylsuccinic acids in the presence of a compatible solvent; separating the diastereoisomeric salts thus formed by fractional crystallization; and regenerating each of the *d*- and *l*-isomers from the separated amine salts.

2. A method of preparing the *d*-isomer and the *l*-isomer of 3 - (2 - pyridyl) - 3 - phenyl - N,N - dimethylpropylamine, which comprises reacting a racemate of said compound with an optically active isomer of a substituted succinic acid selected from the group consisting of phenylsuccinic, chlorophenylsuccinic, nitrophenylsuccinic, methoxyphenylsuccinic, α-2-thienylsuccinic, benzylsuccinic, lower alkylsuccinic and cyclopentylsuccinic acids in the presence of a compatible solvent; separating the diastereoisomeric salts thus formed by fractional crystallization and regenerating each of the *d*- and *l*-isomers from the separated amine salts.

3. A method of preparing the *d*-isomer and the *l*-isomer of 3 - (2 - pyridyl) - 3 - p - chlorophenyl - N,N - dimethylpropylamine, which comprises reacting a racemate of said compound with an optically active isomer of a substituted succinic acid selected from the group consisting of phenylsuccinic, chlorophenylsuccinic, nitrophenylsuccinic, methoxyphenylsuccinic, α-2-thienylsuccinic, penzylsuccinic, lower alkylsuccinic and cyclopentylsuccinic acids in the presence of a compatible solvent; separating the diastereoisomeric salts thus formed by fractional crystallization; and regenerating each of the *d*- and *l*-isomers from the separated amine salts.

4. A method of preparing the *d*-isomer and the *l*-isomer of 3 - (2 - pyridyl) - 3 - p - bromophenyl - N,N-dimethylpropylamine, which comprises reacting a racemate of said isomers with an optically active isomer of a substituted succinic acid selected from the group consisting of phenylsuccinic, chlorophenylsuccinic, nitrophenylsuccinic, methoxyphenylsuccinic, α - 2 - thienylsuccinic benzylsuccinic, lower alkylsuccinic and cyclopentylsuccinic acids in the presence of a compatible solvent; separating the diastereoisomeric salts thus formed by fractional crystallization; and regenerating each of the *d*- and *l*-isomers from the separated amine salts.

References Cited in the file of this patent
UNITED STATES PATENTS

| 2,528,267 | Dearborn et al. | Oct. 31, 1950 |
| 2,534,246 | Cusic et al. | Dec. 19, 1950 |
| 2,604,473 | Sperber et al. | July 22, 1952 |

OTHER REFERENCES

Hackh's Chemical Dictionary, page 18, 3rd ed., 1944.
Karrer: "Organic Chemistry," pages 98–99, 2nd, English ed. (1946).
Migrdichain: "Organic Synthesis," page 538 (1957).